US012774386B2

(12) United States Patent
Jimenez Pardo et al.

(10) Patent No.: US 12,774,386 B2
(45) Date of Patent: Oct. 27, 2026

(54) INJECTION MOLDING MATERIAL FOR PRODUCING MOLDED ARTICLES

(71) Applicant: PACK2EARTH, S.L., Barcelona (ES)

(72) Inventors: Maria Jose Jimenez Pardo, Paterna (ES); Maria Amparo Verdu Solis, Paterna (ES); Miriam Gallur Blanca, Paterna (ES)

(73) Assignee: PACK2EARTH, S.L., Barcelona (ES)

( * ) Notice: Subject to any disclaimer, the term of this patent is extended or adjusted under 35 U.S.C. 154(b) by 474 days.

(21) Appl. No.: 18/286,932

(22) PCT Filed: Apr. 12, 2022

(86) PCT No.: PCT/EP2022/059746
§ 371 (c)(1),
(2) Date: Oct. 13, 2023

(87) PCT Pub. No.: WO2022/218978
PCT Pub. Date: Oct. 20, 2022

(65) Prior Publication Data

US 2024/0190053 A1 Jun. 13, 2024

Related U.S. Application Data

(60) Provisional application No. 63/174,751, filed on Apr. 14, 2021.

(51) Int. Cl.

| | |
|---|---|
| ***C08L 67/04*** | (2006.01) |
| ***B29C 45/00*** | (2006.01) |
| ***B29K 1/00*** | (2006.01) |
| ***B29K 67/00*** | (2006.01) |
| ***B29K 509/00*** | (2006.01) |
| ***C08J 5/04*** | (2006.01) |

(52) U.S. Cl.
CPC ............... *C08L 67/04* (2013.01); *C08J 5/045* (2013.01); *B29C 45/0001* (2013.01); *B29C 45/0005* (2013.01); *B29K 2001/00* (2013.01); *B29K 2067/00* (2013.01); *B29K 2509/00* (2013.01); *Y02W 90/10* (2015.05)

(58) Field of Classification Search
CPC ........................................................ C08L 67/04
See application file for complete search history.

(56) References Cited

U.S. PATENT DOCUMENTS

| | | | | |
|---|---|---|---|---|
| 6,127,512 A * | 10/2000 | Asrar | ........................ | C08K 3/22 528/271 |
| 10,597,528 B2 | 3/2020 | Rallis et al. | | |
| 2015/0291788 A1 | 10/2015 | Carfagnini et al. | | |
| 2018/0208760 A1 | 7/2018 | Rallis et al. | | |

FOREIGN PATENT DOCUMENTS

DE 102019101384 A1 * 7/2020 ............. B32B 27/36

OTHER PUBLICATIONS

Machine translation of DE 102019101384 (2020, 11 pages).*
Sanjeev Singh, et al., "Hybrid bio-composite from talc, wood fiber and bioplastic: Fabrication and characterization", Composites Part A, Feb. 1, 2010, pp. 304-312, vol. 41 , No. 2.
International Search Report for PCT/EP2022/059746 dated Aug. 10, 2022 [PCT/ISA/210].

* cited by examiner

*Primary Examiner* — Brieann R Johnston
(74) *Attorney, Agent, or Firm* — Sughrue Mion, PLLC

(57) ABSTRACT

An injection molding material for producing molded articles having poly(3-hydroxybutyrate-co-3-hydroxyvalerate); cellulose, present between 12 and 17% in weight in relation to the total weight of the components; talc, present between 7 and 9% in weight in relation to the total weight of the components; and a polyadipate ester-based plasticizer, present between 3 and 6% in weight in relation to the total weight of the components. The material is compostable according to the European standard EN 13432 and it has barrier properties according to which the Oxygen Transmission Rate (OTR) is between 5 and 10 $cm^3/m^2 \cdot day$ and the Water Vapour Transmission Rate (WVTR) is between 2 and 7 $g/m^2 \cdot day$.

20 Claims, 9 Drawing Sheets

| PHBV+8%TL+15%CL1+5%PL1 | | | |
|---|---|---|---|
| W1 | W10 | W15 | W16 |
|  |  |  | No sample is detected |
| PHBV+10%TL+10%CL2 | | | |
| W1 | W10 | W15 | W23 |
|  |  |  | No sample is detected |

INJECTION MOLDING MATERIAL FOR PRODUCING MOLDED ARTICLES

CROSS REFERENCE TO RELATED APPLICATIONS

This application is a National Stage of International Application No. PCT/EP2022/059746 filed Apr. 12, 2022, claiming priority based on U.S. Patent Application No. 63/174,751 filed Apr. 14, 2021.

TECHNICAL FIELD OF THE INVENTION

The present invention relates to a material suitable for the producing molded articles by injection. The material is obtainable by melt mixing several components followed by an injection process. Articles which can be produced by injection with that material include, but are not limited to dispensing closures, like caps or spouts, for use on flexible containers, rigid tubs or trays, rigid lids, cutlery, etc.

BACKGROUND OF THE INVENTION

As consumers become more aware of the negative effects of plastic on human health and on the environment, they are demanding environmentally friendly and sustainable packaging and products, including single use articles, in order to reduce the consumption of plastic. Thus, eco-friendly packaging alternatives such as compostable bags and home compostable packaging have been developed. However, it must be taken into account that some of that eco-friendly packaging has not yet reached the same level of mechanical properties and of preservation of the packaged product as achieved with packaging made from conventional plastic.

On the other hand, it is known that techniques for hot moulding plastic materials, such as injection moulding, mainly in producing articles which have a high resistance to deformation such as, for example, disposable cutlery, containers, tubs, plates or capsules for dispensing beverages; the walls of which typically have thicknesses greater than 200 microns.

However, although producing articles with such thicknesses ensures that they have the appropriate resistance to deformation properties, it is nevertheless difficult to ensure that said articles, when made with biodegradable polymers, have disintegrability properties which render them suitable for processing in industrial composting plants.

Industrial compostable and home compostable materials are types of biodegradable materials. Home compostable materials can be discarded either in city organic waste bins with other organic waste such as potato peel or can be composted in home composters and they have to degrade into toxin-free compost in under 12 months. Industrial compostable materials require much higher temperatures to degrade than home compostable materials, hence they need to be processed in industrial plants at the end of their lifecycle.

U.S. Pat. No. 10,597,528B2 relates to a polymer composition that is particularly suitable for use in manufacturing injection molded articles, which can be biodegraded in industrial compositing. It discloses a polymer composition for the production of injection molded articles comprising, with respect to the sum of components i.-v.: i) 20-60% by weight of at least one polyester i. comprising: a) a dicarboxylic component comprising with respect to the total dicarboxylic component: a1) 0-20% in moles of units deriving from at least one aromatic dicarboxylic acid, a2) 80-100% in moles of units deriving from at least one saturated aliphatic dicarboxylic acid, a3) 0-5% in moles of units deriving from at least one unsaturated aliphatic dicarboxylic acid; b) a diol component comprising, with respect to the total diol component: b1) 95-100% in moles of units deriving from at least one saturated aliphatic diol; b2) 0-5% in moles of units deriving from at least one unsaturated aliphatic diol; ii) 30-60% by weight of at least one polyhydroxyalkanoate ii.; iii) 0.01-5% by weight of at least one cross-linking agent and/or a chain extender iii. comprising at least one compound having di- and/or multiple functional groups comprising isocyanate, peroxide, carbodiimide, isocyanurate, oxazoline, epoxy, anhydride, divinyl ether groups and mixtures thereof; iv) 0-10% by weight of at least one filler agent; v) 2-30% by weight of plant fibres. Although it asserts suitability for industrial compostability, home compostability is not mentioned.

Thus, an aim of the present invention is to provide an alternative composition, which is simpler and capable of being injected into molds to make molded articles, without adversely affecting compostability, preferably resulting in an injected molded article having the property of being compostable, and preferably, home compostable.

DESCRIPTION OF THE INVENTION

With the aim of providing a solution a material suitable for the production of molded articles by injection is made known. Said injection molding material for producing molded articles is characterized for comprising the following components:

i) poly(3-hydroxybutyrate-co-3-hydroxyvalerate) (PHBV);
ii) cellulose, present between 12 and 17% in weight in relation to the total weight of the components;
iii) talc, present between 7 and 9% in weight in relation to the total weight of the components; and
iv) a polyadipate ester-based plasticizer, present between 3 and 6% in weight in relation to the total weight of the components;

wherein the injection molding material is compostable according to the European standard EN 13432 and has barrier properties according to which the Oxygen Transmission Rate (OTR) is between 5 and 10 $cm^3/m^2 \cdot day$ at 23° C. and 50% relative humidity over 24 hours according to the guidelines of ASTM D3985-17 standard, and the Water Vapour Transmission Rate (WVTR) is between 2 and 7 $g/m^2 \cdot day$ at a temperature of 38° C. and 90% of relative humidity according to the guidelines of ASTM F1249-13 standard.

The requirements for the industrial compostability of packaging are set out in European standard EN 13432. Materials, products and articles complying with this standard can be certified and labelled accordingly.

Products or articles manufactured with injection molding material can be articles such as a dispensing closure, like a cap or a spout, for use on a flexible container, a rigid tub or tray, a rigid lid, cutlery, etc.

According to a preferred embodiment of the invention, articles made using injection molding and made of the material of the invention are home compostable.

TÜV AUSTRIA is a well-known certification body authorized by European Bioplastics and awards a Seedling logo to products that are in compliance with EN 13432. By awarding both the OK compost INDUSTRIAL and the Seedling logo, TÜV AUSTRIA's certificate holders have a way to give their compostable products recognition throughout the entire European market.

According to TÜV AUSTRIA's website, packaging or products featuring the OK compost INDUSTRIAL label are guaranteed as biodegradable in an industrial composting plant. This applies to all components, inks and additives. The sole reference point for the certification program is the harmonized EN 13432: 2000 standard: in any event any product featuring the OK compost INDUSTRIAL logo complies with the requirements of the EU Packaging Directive (94/62/EEC).

Besides the OK compost INDUSTRIAL label, TÜV AUSTRIA has developed OK Compost HOME label to guarantee complete biodegradability in the light of specific requirements, even in a garden compost heap. Products that are solely OK compost INDUSTRIAL-certified are those that compost only in industrial composting facilities, at temperatures between 55 to 60° C., so products that are solely OK Compost INDUSTRIAL-certified should not go into the garden compost. On the other hand, OK Compost HOME refers to products that also compost at lower temperatures, so they can go into the compost heap in your garden at home, hence the title "HOME".

Thus, in the present specification or description, if a material, product or package is indicated to be "home compostable", it means that it complies with requirements to hold the TUV AUSTRIA OK Compost HOME certification.

According to another characteristic of the invention, the injection molding material of the invention has the following barrier features: an Oxygen Transmission Rate (OTR) between 8.52 and 8.80 $cm^3/m^2 \cdot day$ at 23° C. and 50% relative humidity over 24 hours according to the guidelines of ASTM D3985-17 standard, and a Water Vapour Transmission Rate (WVTR) between 5.60 and 5.92 $g/m^2 \cdot day$ at a temperature of 38° C. and 90% of relative humidity according to the guidelines of ASTM F1249-13 standard.

Another characteristic of the invention is that the material has a Young's modulus of 3.50±0.10 Gpa. It also has an elongation at break of 1.91±0.19% and a melt flow index (MFI) of 29.18±0.55 g/10 min.

According to a preferred embodiment of the material of the invention, the cellulose is present between 14.5 and 15.5% in weight in relation to the total weight of the components, further preferably in a 15% in weight in relation to the total weight of the components. Another characteristic of this preferred embodiment is that the fiber length of the cellulose is between 30 and 45 μm, and more preferably of 40 μm, and the diameter of the fiber of cellulose is between 18 and 22 μm, more preferably of 20 μm. In addition, the raw material of the cellulose is preferably hardwood cellulose.

According to the same preferred embodiment, the talc is present between 7.50 and 8.50% in weight in relation to the total weight of the components, being preferably present in 8%.

According to the same preferred embodiment, the talc is present between 7.50 and 8.50% in weight in relation to the total weight of the components, being preferably present in 8%.

According to the same preferred embodiment, the components of the material consist in:

i) poly(3-hydroxybutyrate-co-3-hydroxyvalerate) (PHBV), present between 68 and 78% in relation to the total weight of the components;
ii) cellulose, present between 12 and 17% in weight in relation to the total weight of the components;
iii) talc, present between 7 and 9% in weight in relation to the total weight of the components; and
iv) a polyadipate ester-based plasticizer, present between 3 and 6% in weight in relation to the total weight of the components.

In addition, in a further preferred embodiment, the poly (3-hydroxybutyrate-co-3-hydroxyvalerate) (PHBV) has a content of hydroxyvalerate comprised between 2 and 5% in weight in relation to the total PHBV weight.

According to another embodiment, a further component of the injection molding material of the invention is a bio-based polybutylene succinate (PBS) produced from polymerization of bio-based succinic acid and 1,4-butanediol. Preferably, the bio-based PBS is present between 3 and 7%, more preferably in a 5%, in weight in relation to the total weight of the components.

In a second aspect of the invention, an injection-molded article made of the material of the invention, according to the previous description, is disclosed. Said injection-molded article is home compostable. Further, the injection-molded article may be conformed by one or more parts having a width of wall equal to or less than 2 mm, preferably equal to or less than 1 mm.

In a third aspect of the invention, the use of the material as previously disclosed for the manufacture of an injection-molded article is disclosed.

BRIEF DESCRIPTION OF THE DRAWINGS

In the attached drawings, the manufacturing process of a closure featuring a spout and a cap produced with the injection molding material which is the object of the invention is illustrated in an exemplary and non-limiting manner, as well as the manufacturing of an article in the form of a tub produced with the material of the invention. According to the invention, the closure and the tub have been obtained by injecting the composition of the injection molding material of the invention into a corresponding mold. In said drawings:

FIG. 13 is Testometric M350-20CT equipment for a tensile resistance test;

DETAILED DESCRIPTION OF THE INVENTION AND DRAWINGS

Figure 1:
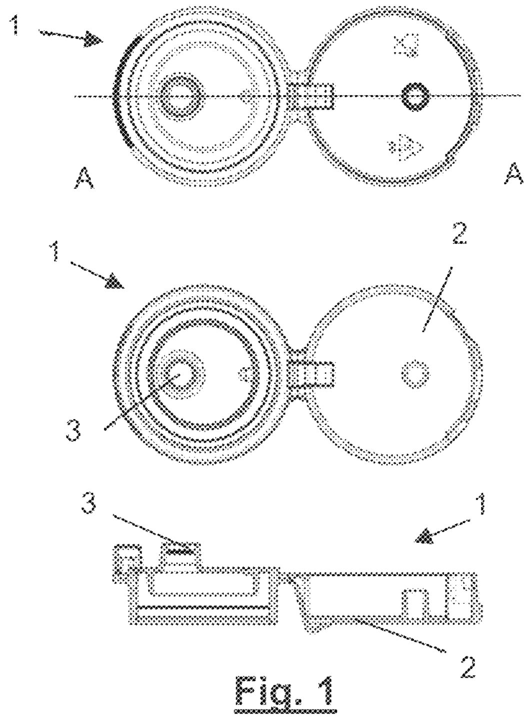
FIG. 1 is a compilation of several views (top, section A-A and front views) of a flip top closure provided with a spout and a cap, in an opened position, to be produced with the material object of the invention.
Figure 14:
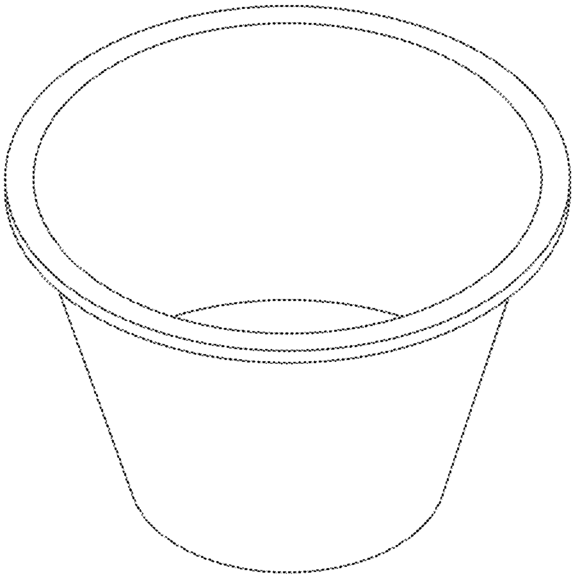
FIG. 14 shows a tub made of the material object of the invention.

FIG. 1 shows a group of a top view, a cross section A-A and a front view of a closure 1 of those provided with a spout 3 and a cap 2 to be produced with the injection molding material which is the object of the invention. Besides closures, the material is suitable for manufacturing food grade articles, rigid or not, such as tubs (see also FIG. 14), lids, cutlery, dishes, etc., as well as non-food grade items produced using injection molding.

The composition to be injected in order to obtain the injection molding material from which a molded article like the closure 1 of FIG. 1 is made, comprises the following components:

- a matrix of poly(3-hydroxybutyrate-co-3-hydroxyvalerate) (PHBV);
- cellulose, present between 12 and 17%, preferably 15%, in weight in relation to the total weight of the components;
- talc, present between 7 and 9%, preferably 8%, in weight in relation to the total weight of the components; and
- a polyadipate ester-based plasticizer present between 3 and 6%, preferably 5%, in weight in relation to the total weight of the components, comprising a polyadipate ester.

The above-disclosed composition has been conceived by the inventors in order to obtain by a later injection process a material suitable for manufacturing by injection the kind of molded articles above mentioned. The material is a compostable material according to European standard EN 13432 and, in fact, home compostable, and has improved barrier properties of Oxygen Transmission Rate (OTR) and Water Vapour Transmission Rate (WVTR), as well as mechanical properties such as Young's modulus and elongation at break. Said properties will be detailed further below.

The matrix of PHBV is the body of the material and it provides its basic properties. Cellulose has proved to be important in accelerating the compostability process of the material. The addition of talc has shown that it improves the barrier properties of the material of injection, making it difficult for oxygen and water vapor molecules to pass through. As it will be shown, the polyadipate ester-based plasticizer is not a mere plasticizer but also provides elasticity to the material, causing the chains of the PHBV polymer to be able to move more without detriment to the barrier properties of the material.

Table 1 shows a preferred composition, referred to in the table as T-01, made of selected commercial products for the preparation of the above-disclosed composition that was later injected into a mould, as it will be later explained.

TABLE 1

| Ref. | Description | Material grade | Ref. components | Processing technique |
|---|---|---|---|---|
| T-01 | Main matrix | PHBV ENMAT ™ Y1000P | PHBV | Compound + |
| | Cellulose | 15% Arbocel 600/30 PU | CL1 | Injection |
| | Talc | 8% Luzenac HAR T84 | TL | moulding |
| | Plastizicer | 5% Glyplast 206/5 NL | PL1 | |

1. Description of the Components for the Preparation of the Material of the Invention The components to be melt mixed and which compose the mixture to be injected for producing molded articles is disclosed below.

1.2. PHBV of Composition T-01: ENMAT™ Y1000P

Poly(3-hydroxybutyrate-co-3-hydroxyvalerate), commonly known as PHBV is a polyhydroxyalkanoate-type polymer. It is a thermoplastic linear aliphatic co-polyester.

Polyhydroxyalkanoates (PHAs) are aliphatic polyesters produced from renewable feedstocks. PHAs are synthesized directly via fermentation of a carbon substrate inside a microorganism. Depending on the microorganisms and the cultivation conditions, homo- or copolyesters with different hydroxyalkanoic acids can be obtained. The most prominent commercially available PHAs are poly-3-hydroxybutyrate (PHB), poly-3-hydroxybutyrate-co-4-hydroxybutyrate (P (3-HB-co-4-HB)), poly-3-hydroxybutyrate-co-3-valerate (PHBV), and polyhydroxybutyrate-co-hexanoate (PHBH).

Poly(3-hydroxybutyrate-co-3-hydroxyvalerate) (PHBV) can be obtained by the copolymerization of 3-hydroxybutanoic acid and 3-hydroxypentanoic acid. It can also be produced naturally by bacteria. PHBV undergoes bacterial degradation in the environment.

The monomers, 3-hydroxybutanoic acid and 3-hydroxypentanoic acid, are joined by ester bonds. The property of the PHBV depends upon the ratio of these two monomers in it.

PHBV ENMAT™ Y1000P, supplied by TianAn Biologic Materials, is a matrix of poly(3-hydroxybutyrate-co-3-hydroxyvalerate) (PHBV). Advantageously, the poly(3-hydroxybutyrate-co-3-hydroxyvalerate) (PHBV) used in the melt mixing composition, has a content of hydroxyvalerate comprised between 2 and 5% in weight in relation to the total PHBV weight.

ENMAT™ Y1000P is a thermoplastic resin that can be used as a primary component in an injection molding application. According to its technical data sheet, its typical material properties are those shown in Table 2. Typical processing temperature settings of ENMAT™ Y1000P or injection molding applications are given in Table 3.

TABLE 2

| Typical material properties of ENMAT ™ Y1000P | |
|---|---|
| Specific Gravity | 1.25 |
| Yield Stress (MPa) | 31-36 |
| Tensile Strength (MPa) | 39 |
| Elongation at Break (%) | 2 |
| Young's Modulus | 2800-3500 |
| Flexural Modulus | 3520-4170 |
| Vicat softening temperature (° C.) | 166 |
| Notched Izod Impact (J/m) | 22 |
| DSC Melting Point (° C.) | 170-176 |

TABLE 3

| | |
|---|---|
| Feed Temperature: | 135° C. |
| Compression Section: | 145° C. |
| Metering Section: | 155° C. |
| Adapter: | 160° C. |
| Die: | 160° C. |
| Screw Speed: | 40-50 r.p.m. |
| Mould Temperature: | 60° C. |

ENMAT™ Y1000P resin can be successfully dried using most standard drying systems. Recommended conditions are provided for standard desiccant based column dryers. It is recommended that ENMAT™ Y1000P is dried to a maximum of 250 ppm of moisture as measured by the Karl Fischer method. Regarding raw material drying conditions, typical desiccant dryer regeneration temperatures should not exceed 100° C. for ENMAT™ Y1000P resin. To prevent issues with pellet bridging, sticking or melting, the drying system should be verified to ensure temperature control is adequate during operation as well as during regeneration cycles since valve leakage is common in many systems. Installation of a water-cooled after-cooler may be necessary to prevent the drying air temperature from exceeding the recommended set point when drying.

Prior to introducing ENMAT™ Y1000P resin into any melt processing system, the system must be properly cleaned and purged to prevent any polymer cross contamination. ENMAT™ Y1000P resin injection molds on most conventional equipment. The mold must be heated to at least 60° C. to ensure maximum crystallinity and easy ejection of the final part from the mold.

1.3. Cellulose ARBOCEL® 600-30 PU

In the preferred composition of the invention, the cellulose fiber length is between 30 and 45 μm, preferably about 40 μm, and the diameter of the cellulose fiber is between 18 and 22 μm, being preferably of 20 μm. The raw material of the cellulose is hardwood cellulose. Product ARBOCEL® BE600-30 PU has been selected as the cellulosic component. Its raw material is hardwood cellulose. It has a white micro fiber structure, with a fiber length fiber of 40 μm, a fiber diameter of 20 μm, and a bulk density of 190-250 g/L. Its sieve analysis max. sieve residue [%] is 2% of 45 μm, 0% of 71 μm.

Cellulose ARBOCEL® BE600-10-TG was also tested. Its raw material is hardwood cellulose and it has a white short fiber structure, with a fiber length of 18 μm, a fiber diameter of 15 μm, and a bulk density of 230-300 g/L. Its sieve analysis max. sieve residue [%] is 0.5% of 32 μm and traces of 50 μm. This cellulose will be referred as CL2.

1.4. Talc Luzenac HAR® T84

LUZENAC HAR® T84, of the company IMERYS, is a high aspect ratio talc produced using a proprietary delamination process. According to its technical data sheet, HAR® T84 is far more lamellar than any other conventionally micronized grade on the market and provides outstanding mechanical properties in polymers. It is explained that higher flexural modulus, HDT and good dimensional stability (low CLTE, shrinkage) are obtained without impairing the ductility of molded parts. HAR® T84 is densified and has excellent flow properties for easy handling and high extruder throughput. The properties of LUZENAC HAR® T84 are shown in the Table 4 below:

TABLE 4

| Typical Properties | |
|---|---|
| Whiteness (Minolta CR400, illuminant D65/2°) Y | 84 |
| L* (CIE) | 91.0 |
| a* (CIE) | −0.2 |
| b* (CIE) | 0.0 |
| B.E.T. (ISO 9277) | 19.5 $m^2/g$ |
| Specific gravity (ISO 787/10) | 2.78 $g/cm^3$ |
| Tapped bulk density (ISO 787/11) | 0.74 $g/cm^3$ |
| Loose bulk density (EN 1097/3) | 0.65 $g/cm^3$ |
| Hardness (Mohs' scale) | 1 |

Its chemical analysis by X-ray fluorescence is as follows: 56% of $SiO_2$, 31% of MgO, 3.2% of $Al_2O_3$, 0.7% of $Fe_2O_3$, 0.6% of CaO. Loss on ignition at 1050° C. is 6.9%, loss on ignition at 625° C. is 1.9% and moisture content at 105° C. (ISO 787/2) is <0.8%. Particle size distribution by sedigraph, according to Sedimentation analysis, Stokes' Law (ISO 13317-3), shows Median Diameter D50 of 2.0 μm and D95 of 11.3 μm. Particle size distribution by laser mastersizer, according to Laser diffraction, Mie Theory (ISO 13320-1) shows Median Diameter D50 of 10.5 μm and D95 of 34.2 μm.

1.5. Plastizicer GLYPLAST 206/5 NL

According to the technical data sheet of GLYPLAST 206/5 NL, by Condensia, it is a low molecular weight polymer that incorporated into a polymeric matrix offer outstanding properties such as migration and extraction resistance, weather stability, high temperature performance, high mechanical properties, negligible toxicity and good environmental compatibility. Due to these properties, polymeric plasticizers are generally adapted to undergo the stricter legislation norm for food contact materials (EU and FDA). Glyplast 206/5 NL is a polyadipate ester-based plasticizer with the following properties: Ester content >99%; density=1.10 $g/cm^3$ (25° C.) ASTM D 1045; viscosity=2,200 mPa·s (25° C.) ASTM D 445; Acid Number≤1.5 mg KOH/g ASTM D 974; and water content≤0.1% ASTM E 203.

PHBV is a polyhydroxyalkanoate-type aliphatic polyester. The one employed in the composition of the invention (see T-01 Table 1) contains low hydroxyvalerate rates, 2-5% in weight in relation to the total weight of PHBV. Despite its good oxygen barrier and mechanical properties, due to its brittleness, stiffness, and low thermal stability during processing, its applications are limited. To overcome this issue, PHBV is blended with other biodegradable polymers and elastomers/rubbers are currently being investigated.

When a reactive extrusion process is applied to PHBV blends, both reactions of dynamic crosslinking of elastomer/rubber (plasticizer) and grafting between the elastomer/rubber and the thermoplastic (PHBV) occur. Hence, fine morphologies with improved interfacial interaction between elastomer/rubber and thermoplastic phases are obtained. If the blend is compatible, the dispersed phase within the polymeric matrix is stabilized, preventing its agglomeration into large domains and the further delamination when thermally processed.

In this context, the incorporation of highly viscous high-molecular-weight compounds (HMW) as both plasticizers and as a chain extender, into PHBV have proven to improve its brittleness and broaden its processing window. For instance, a glycidyl methacrylate-type compound of HMW, when added to PHBV as a chain extender at 0.25-1% wt, was reported to effectively increase its viscosity, but without improving its mechanical properties.

Regarding GLYPLAST 206/5 NL, the plasticizer employed in the T-01 formulation, as mentioned before, is a HMW-NR mainly composed of polyadipate esters. Polyadipates are aliphatic compounds, formed from polyalcohols and adipic acid, resulting in linear or lightly branched polyester polyols. Commonly employed as plasticizers and as a chain extender (CE), when copolymerized with thermoplastics, polyadipate compounds can impart flexibility as well as modifying the thermomechanical properties of the pristine polymer (i.e. reduce melt viscosity, lower the elastic modulus and glass transition temperature).

Researchers tested PHBV blended with cellulose acetate (CA)-plasticized with triethyl citrate (TEC) to increase compatibility-, and poly(styrene-acrylic-co-glycidyl methacrylate) as CE (see Meereboer, K. W., Pal, A. K., Misra, M., & Mohanty, A. K. (2020). Sustainable PHBV/cellulose acetate blends: the effect of a chain extender and a plasticizer. ACS omega, 5(24), 14221-14231). Authors reported the lack of miscibility between the PHBV and the plasticized cellulose acetate (pCA), together with a notable reduction of the polymeric matrix mechanical properties. The latter is attributed to PHBV degradation during the thermal process, leading to a lower density of the copolymer and higher porosity. In addition, the plasticizer TEC migrated during processing, partially plasticizing PHBV, reducing its melt temperature, increasing the matrix crystallinity (not desirable) and its porosity. Whereas the CE (known for rebuilding the molecular weight) addition increased the polymeric matrix density, seemingly mitigating the porosity of the PHBV/pCA blends.

Miscibility is a relevant aspect in polymer blending, allowing a homogenous mixture during processing and optimizing the blend's thermomechanical properties. In this sense, cellulose, a polysaccharide with high crystallinity and insoluble in organic solvents, is usually derivatized into cellulose esters, such as the cellulose acetate esters (CA), to improve processability.

PHBV and cellulose triacetate, were reported to be miscible and showed improved tensile properties, when prepared through solvent casting, suggesting that the lack of miscibility appreciated in the former research cited, could be attributable to the incorporation of TEC.

On the other hand, another formulation referred as T-02 was tested before reaching the composition of the invention (preferably T-01 of Table 1). In T-02 the plasticizer was not a polyadipate ester-based plasticizer, namely, the plasticizer was a plasticizer known as Proviplast 2624. T-02 contained as the main matrix a product commercial known as M·Vera® GP1012 (B0065), supplied by BIO-FED (Branch of AKRO-PLASTIC GmbH), instead of PHBV, namely 87% in weight with respect to the total weight of the composition, 8% of talc Luzenac HAR T84, 5% of plasticizer Proviplast 2624 and without cellulose. M·Vera® GP1012 (B0065) is a biodegradable polyester compound for injection moulding. It has the certifications of OK compost HOME (NF T51-800 [11-2015], certified by TÜV AUSTRIA Belgium), and OK biodegradable SOIL (ISO 17556/EN 13432, certified by TÜV AUSTRIA Belgium). The chemical composition of Proviplast 2624 is mainly tributyl 2-acetylcitrate, which has been used before in attempts to improve the mechanical properties (such as flexibility and toughness) of PHBV. This plasticizer presents a lower molecular weight than GLYPLAST (402.5 vs >2500 g/mol respectively) and according to its properties and structure, more compatibility to interact with cellulose, and for this reason it was expected to have good results with Proviplast 2624.

Besides, it is desirable that plasticizers present low mobility in the PHBV matrix to avoid the migration of this additive to the surface, to prevent the contamination of the materials in contact with the blend. HMW-NR such as GLYPLAST 206/5 NL are more suitable due to their low mobility along the polymeric matrix. On the contrary, lower molecular compounds as tributyl citrates, could provide mobility to the PHBV polymer chains affecting its glass transition, leading to a greater crystallinity index.

Thus, it resulted in a synergic interaction between the biopolymers proposed in formulation T-01, indicating a polyadipate ester-based plasticizer, like GLYPLAST 206/5 NL, as the most suitable plasticizer and chain extender as well. The polyadipate ester-based plasticizer proved that it aids PHBV to rebuild its structure during processing, while maintaining its good mechanical properties, despite slightly reducing its oxygen and water barriers.

2. Description of Processing Techniques and Parameters 2.1. Characterization of Barrier Properties Barrier properties of the resulting material from the injection of composition T-01 in Table 1 were measured following the methodology below. Oxygen and water vapour have been considered since they are the most critical specifications that could affect the conservation of packaged products.

2.1.1. Characterization of Barrier Properties to Oxygen

Barrier properties were measured according to Oxygen Transmission Rate (OTR) and following the guidelines of the ASTM D3985-17 standard. OTR is defined as the amount of oxygen gas passing per unit area of the parallel surfaces of a plastic film per unit of time under a given unit area of the parallel surfaces of a plastic film per unit of time under specified test conditions. The unit in which it is commonly measured is $cm^3/m^2 \cdot day$. The oxygen transmission rate (OTR) is determined after reaching equilibrium, in terms of temperature and relative humidity (RH), of the environment in which the sample is placed. A dry environment is one in which the RH is below 1% and a controlled RH environment is one in which the RH is within 35-90%. In this case, the selected conditions were 50% of RH at a temperature of 23° C., similar to the expected conditions of use of the materials. The samples were measured using an OX-TRAN® Model 2/21 (Mocon).

Figure 10:
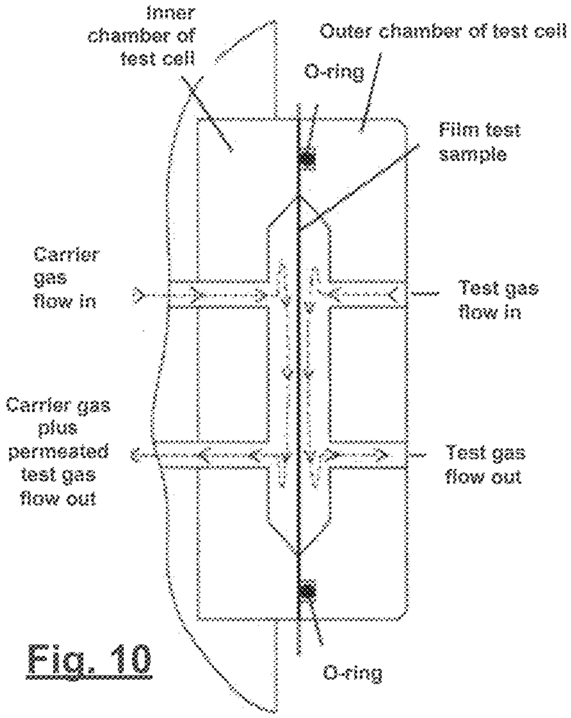
FIG. 10 is a diagram of a barrier properties measure cell, wherein each equipment has two cells.

The sample was placed in each cell under atmospheric pressure. As shown in FIG. 10, a carrier gas ($N_2$ 98%, $H_2$ 2%) passes through one side of the cell and, through the opposite side of the cell, the test gas flows ($O_2$ 99.95% purity). The oxygen that passes through the cell is collected by the carrier gas, to carry it to a coulometric sensor which produces an electric current. This current is proportional to the oxygen quantity which flows to the detector per time unit.

Figure 11:
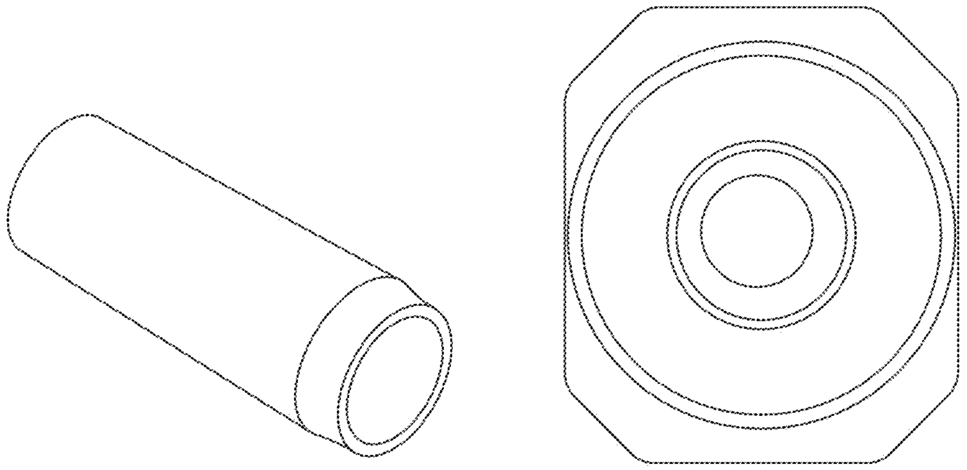
FIG. 11 shows the preparation of the samples with a suitable surface area to measure the barrier properties.

For the rigid material, test probes were processed by injection with a round shape and a thickness of 460 μm. Specifically, a 12.636 $cm^2$ area was prepared for each sample to carry out measurements by cutting them with a hole puncher (FIG. 11—left). Then, they were masked up to 4.941 $cm^2$ with aluminium sealing masks (FIG. 11—right) and lastly, the thickness of each sample was registered (at least five different measurements were taken).

The sample was placed in the cell, adjusting temperature and relative humidity control, and the flow of gases was established. The equipment can be programmed to measure in different ways:

- continuously: it is necessary to stop it manually.
- standard: a determined number of cycles is selected by the user.
- convergence by cycles: the equipment consider that the equilibrium has been reached when two values differ by less than 1% of 0.05 $cm^3/m^2 \cdot day$ (whichever is bigger) in a determined number of cycles.
- convergence by hours: the equipment consider that the equilibrium has been reached when two values differ by less than 1% of 0.05 $cm^3/m^2 \cdot day$ (whichever is bigger) in a determined number of hours.

Once the measurement was finished, the value of OTR could be extracted from the equipment for each sample measured. At least 2-3 samples of each reference were measured, and the average value and deviation were calculated.

2.1.2. Characterization of Barrier Properties to Water Vapor

Barrier properties were measured according to the Water Vapour Transmission Rate (WVTR) and following the guidelines of ASTM F1249-13 standard, using the units $g/m^2 \cdot day$. The methodology was the same followed in the determination of the oxygen barrier.

The measurement conditions were more restrictive in this case, a temperature of 38° C. and RH of 90% were selected. The equipment used was Permatran W 3/33 SG+(Mocon). Once the measurement was finished, the value of WVTR could be extracted from the equipment for each sample measured. At least 2-3 samples of each reference were measured, and the average value and deviation were calculated.

2.2. Characterization of the Tensile Resistance

The mechanical property of tensile resistance of the resulting rigid material from the injection of the injection molding composition of the invention (T-01 in Table 1) was evaluated.

The aim of the tensile resistance test is to determine the resistance of a material when it is subjected to an axial tensile stress, following the directions of the ISO 527-1 standard. It consists of applying an increasing stress to a standardized test probe, with respect to its longitudinal axis, until it breaks. This effort is applied at constant speed and the force applied and elongation of the sample are continuously measured.

Figure 12:
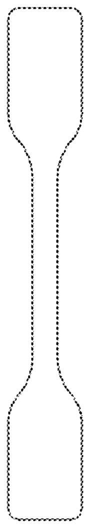
FIG. 12 is a test probe for tensile resistance analysis obtained by injection molding.

The test probes were obtained by an injection molding process with standardized dimensions; in this case 5A type, which has 50 mm of length, width of 12.5 mm at its widest part and 4 mm at the narrowest and a thickness of 2 mm (FIG. 12).

The speed test is selected according to the material, considering the tolerance set by the standard. The rigid materials are tested at 20 mm/min. Regarding the number of measurements, it can be adjusted depending on the desired accuracy on the results, with five specimens being the minimum established. All the values obtained must be considered, including the ones of higher deviation, since it may show a variable nature of the material. Before the test, the samples must be conditioned at the conditions set by the standard during at least 16 h. The recommended conditions are a temperature of (23±2° C.) and a relative humidity of (50±10)%.

Figure 13:
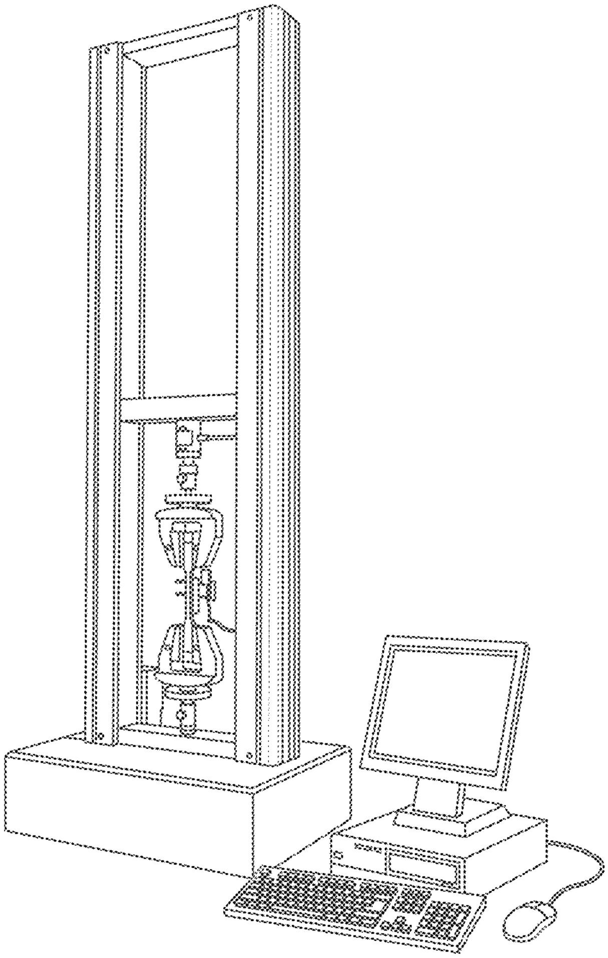
FIG. 13 shows the Testometric M350-20CT equipment to determine tensile resistance.

The equipment employed was a Testometric M350-20CT, shown in FIG. 13. The test probe is placed between the clamps. The test starts when a force is applied in a longitudinal direction and finishes when the sample breaks. As mentioned above, during the test the force applied and the elongation that the test probe suffers are continuously measured. With these parameters it is possible to calculate other parameters, such as the Young Modulus and the percentage of elongation at break.

3. Test Results of Characterization of Barrier and Mechanical Properties

The material resulting from the injection molding composition of the invention, referred as T-01, consisting of 72% of PHBV ENMAT™ Y1000P, 15% of cellulose ARBOCEL® 600/30 PU, 8% of talc Luzenac HAR T84 and 5% of plasticizer Glyplast 206/5 NL (% are referred to the weight of a component in relation to the total weight of the composition) had the following barrier and mechanical properties in Tables 5 and 6:

TABLE 5

| Reference | Young Modulus Long. (GPa) | Elongation at break long. (%) | MFI (g/10 min) |
|---|---|---|---|
| T-01 | 3.50 ± 0.10 | 1.91 ± 0.19 | 29.18 ± 0.55 |

TABLE 6

| Reference | OTR $cm^3/m^2 \cdot day$ | WVTR $g/m^2 \cdot day$ |
|---|---|---|
| T-01 | 8.66 ± 0.14 | 5.76 ± 0.16 |

The material resulting from the injection moulding composition of the invention is considered to have a high barrier, with an oxygen transmission rate (OTR) and water vapor transmission rate above 5 ($cm^3/m^2 \cdot day$ and $g/m^2 \cdot day$, respectively). The Oxygen Transmission Rate (OTR) is 8.66±0.14 $cm^3/m^2 \cdot day$ at 23° C. and 50% relative humidity over 24 hours according to the guidelines of ASTM D3985-17 standard, and the Water Vapour Transmission Rate (WVTR) is 5.76±0.16 $g/m^2 \cdot day$ at a temperature of 38° C. and 90% of relative humidity according to the guidelines of ASTM F1249-13 standard.

4. Description of Processing Techniques and Parameters

The description of the processing techniques and processing parameters optimized for the injection moulding material are shown in the following sections.

4.1. Compound Processing

The first step in the development of the closure was the production of the compound, that is to say, the injection molding composition, namely according to the composition of Table 1. The selected components were processed in a twin screw extruder following the methodology described below.

The components were conditioned prior to machine processing. The drying stage was carried out, up to the recommended or established limits to process polyhydroxybutyrate-co-valerate in an appropriate way, for 6 hours at 100° C. The moisture content was less than 0.025% (250 ppm) to prevent viscosity degradation. The talc was dried under vacuum at 90° C. during 48 h, and the cellulose was also dried under vacuum at 90° C. during 72 h.

Figure 2:
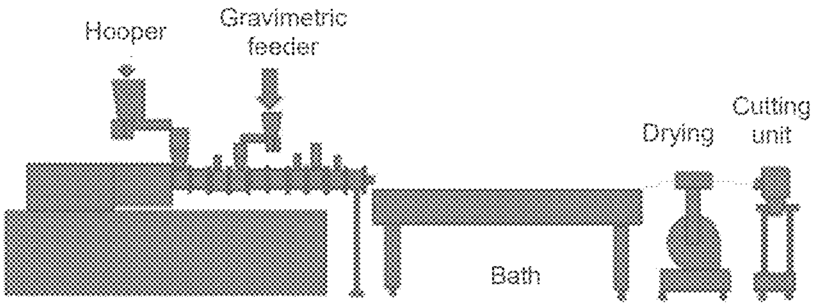
FIG. 2 is a scheme of a Coperion model ZSK 26MC co-rotating twin screw extruder for producing the composition prior to injection in order to obtain the material object of the invention.
Figure 3:
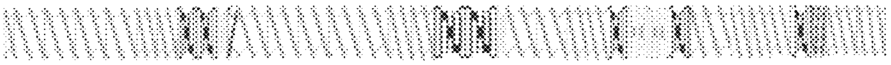
FIG. 3 is a screw configuration used to process composition to be suitable for its later injection.

The components were processed in a co-rotating twin screw extruder, model ZSK 26MC from Coperion GmbH (FIG. 2) with a diameter of 26 mm and a L/D ratio of 40 (which means that the length is 40 times the diameter of the screw). The co-rotating twin screw extruder is equipped with a main gravimetric pellet feeder DDWMST FW40 (Brabender, Duisburg, Germany), a secondary dosing system for solids (DDW MD2 DSR 28-10), or liquids (FDDW-MD2 DZP-6). The screw configuration used is shown in FIG. 3.

The processed components were introduced as follows: PHBV ENMAT™ Y1000P through the main feeder, a mixture of the cellulose and the talc in the secondary feeder, and the plasticizer in the liquids system. The mixture was melted at a certain temperature profile (Table 7), a screw speed (wscrew) of 300 rpm and a material feed speed of 13 kg·h$^{-1}$. The extruder response parameters, such as melt temperature (Tmelt), specific mechanical energy (SME) and torque, are shown in Table 8. Once the material was melted and mixed, it left the extruder, was pelletized and collected to be further transformed in the next step.

TABLE 7

Temperature profile used in the compounding process

| Hooper (° C.) | Zone 2 (° C.) | Zone 3 (° C.) | Zone 4 (° C.) | Zone 5 (° C.) | Zone 6 (° C.) | Zone 7 (° C.) | Zone 8 (° C.) | Zone 9 (° C.) | Die (° C.) |
|---|---|---|---|---|---|---|---|---|---|
| 165 | 170 | 170 | 175 | 170 | 170 | 170 | 170 | 170 | 170 |

TABLE 8

Response parameters during compounding process

| Tm (° C.) | SME kWh/kg | Torque % |
|---|---|---|
| 169 | 0.229 | 43 |

4.2. Injection Molding of the Flip Top Type Closure 4.2.1. Equipment Description The industrial scale processing took place in a packaging manufacturing facility. It consisted of injecting a sauce bottle flip top closure. Its dimensions were 47.6 mm in diameter with a maximum thickness of 1.9 mm. The total volume was 10 cm$^3$. Some special features of this closure were the integral hinge, the plug seal, and the tamper evidence device. The shape and proportions of the flip top closure were those shown in FIG. 1.

Figure 4A:
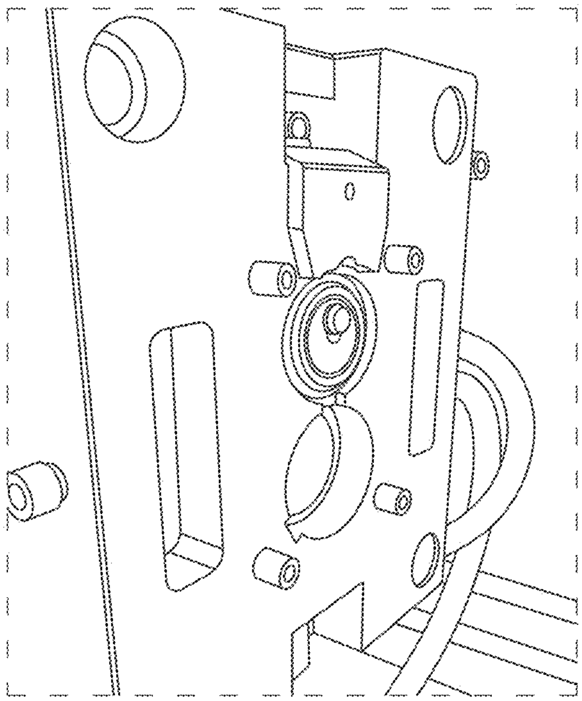
FIGS. 4*a* and 4*b* are the two parts of a single cavity mold for the manufacture of the flip top closure of FIG. 1.
Figure 4B:
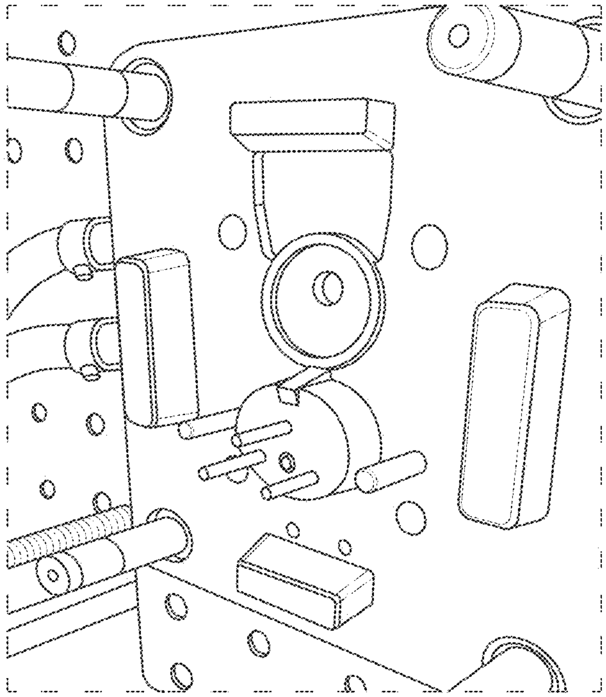

The bottle flip top closure was processed by means of a Demag Ergotec Injection molding machine with a maximum clamping force of 150 metric tons. The bottle flip top closure was injected in a single cavity mold in which the temperature was controlled by an external cooling system. Its temperature range was set between 30° C. and 60° C. in order to control the crystallization ratio of the part and therefore its mechanical properties. The mold used is shown in FIGS. 4*a* and 64*b*.

Composition T-01 of Table 1 was found to be suitable for the injection molded part. Prior to the injection molding of the flip top closure 1, the formulation based on the composition T-01 of Table 1 was characterized. Mechanical properties were determined by a uniaxial tensile test. The results are given in Table 9 and are compared with an injection molding grade of PP homopolymer.

TABLE 9

Tested properties of the compositions

| Material | Young's modulus (GPa) | Elastic limit (MPa) | $\varepsilon_{l,e}$ (%) | $\varepsilon_{r,}$ (%) | Tm (° C.) | ΔHm (J · g$^{-1}$) | ΔHc (J · g$^{-1}$) |
|---|---|---|---|---|---|---|---|
| T-01 | 3.5 | 27 | 1.5 | 1.9 | 170 | 70.14 | 64.79 |
| PP Homo-polymer | 1.65 | 35 | 9 | — | — | — | — |

Figure 5:
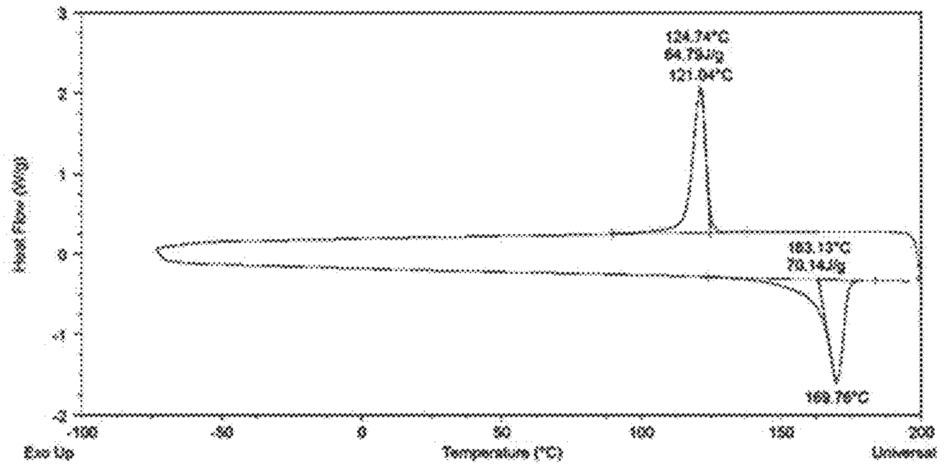
FIG. 5 is the DSC heat flow curve for a polypropylene homopolymer tested for injecting a flip top closure like the one of FIG. 1.
Figure 6:
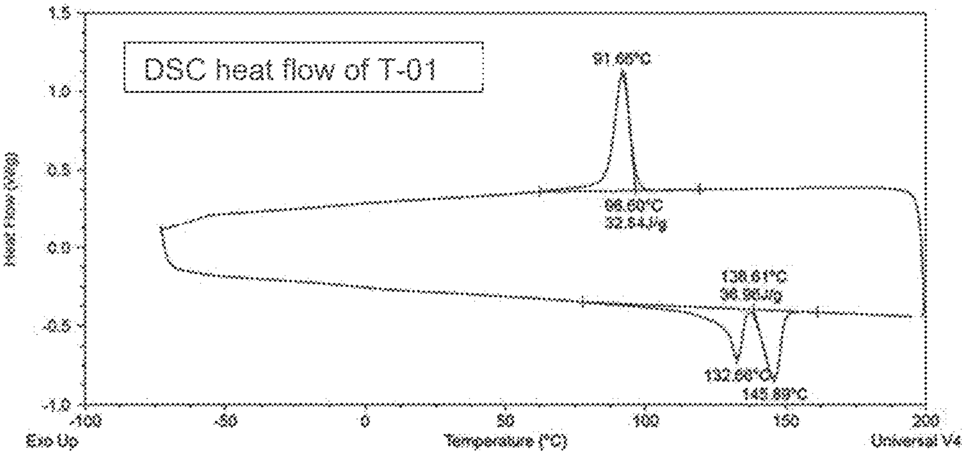
FIG. 6 is the DSC heat flow curve for the composition of the invention used for the injection of a flip top closure as that of FIG. 1.

The thermal properties of the formulations were determined using a DSC (Differential Scanning calorimetry) test procedure. The heat flow curves of both materials used for the injection of the flip top closure are shown in FIGS. 5 and 6.

4.2.2. Injection Molding Processing Parameters

The processing parameters are shown in the following tables: Table 10 (Profile temperatures of the cylinder), Table 11 (Plastication Stage Parameters), Table 12 (Injection Stage Parameters) and Table 13 (Cycle Times where Tmto is the temperature of pre-heating of the mold).

TABLE 10

Profile temperatures of the cylinder

| Formula | Thermal gate (%) | Nozzle (° C.) | Z1 (° C.) | Z2 (° C.) | Z3-F (° C.) | Z3-R (° C.) |
|---|---|---|---|---|---|---|
| T-01 | 17 | 180 | 180 | 175 | 170 | 160 |

TABLE 11

Plastication Stage Parameters

| Formula | Metering Volume (mm) | Back Pressure (Bar) | Screw Speed (U/min) | Dosage Time (s) |
|---|---|---|---|---|
| T-01 | 22 | 35 | 150 | 1.61 |

TABLE 12

| Injection Stage Parameters | Formulation composition | |
|---|---|---|
| Formulation composition | T-01 (60° C.) | T-01 (30° C.) |
| Injection Volume (mm) | 14 | 14 |
| Cushion (mm) | 8 | 8 |
| Injection Speed (mm/s) | 65 | 65 |
| Injection Pressure (Bar | 504 | 569 |
| Holding Pressure (bar) | 203 | 181 |
| Injection Time (s) | 0.29 | 0.29 |
| Holding Time (s) | 0.35 | 0.35 |
| Cooling Time (s) | 15 | 10 |

TABLE 13

| Cycle Times | | | | | |
|---|---|---|---|---|---|
| Material | Dosage time (s) | Injection time (s) | Tmto (s) | Cooling time (s) | Cycle time (s) |
| T-01 (60° C.) | 1.61 | 0.29 | 0.35 | 15 | 21.2 |
| T-01 (30° C.) | 1.61 | 0.29 | 0.35 | 10 | 18.1 |

The first reference processed was the T-01 composition with the mold tempered at 60° C.

The temperature profile was chosen in such a way as to ensure complete melting of the material without risk of thermal degradation of the material. Therefore, the maximum temperature of the temperature profile was limited to 180° ° C., which corresponds to the end of the melting curve observed in the thermogram of the material (see FIG. 5).

Subsequently, the injection pressure was adjusted until the cavity was completely filled. This pressure, although it was not excessive, was limited by the structural integrity of the mold and the appearance of flash on the part. Finally, the cooling time was adjusted to 15 seconds to prevent the piercing of the part by the ejectors at a shorter cooling time. The final cycle time was 21.2 seconds.

The obtained part was completely filled and had a good appearance, with no flash or sink marks.

In order to evaluate the influence of the crystalline structure on the mechanical behavior of the integral hinge, the mold temperature was lowered to 30° C. The result was that the integral hinge did not break and was able to withstand some closing cycles before breaking.

Figure 7:
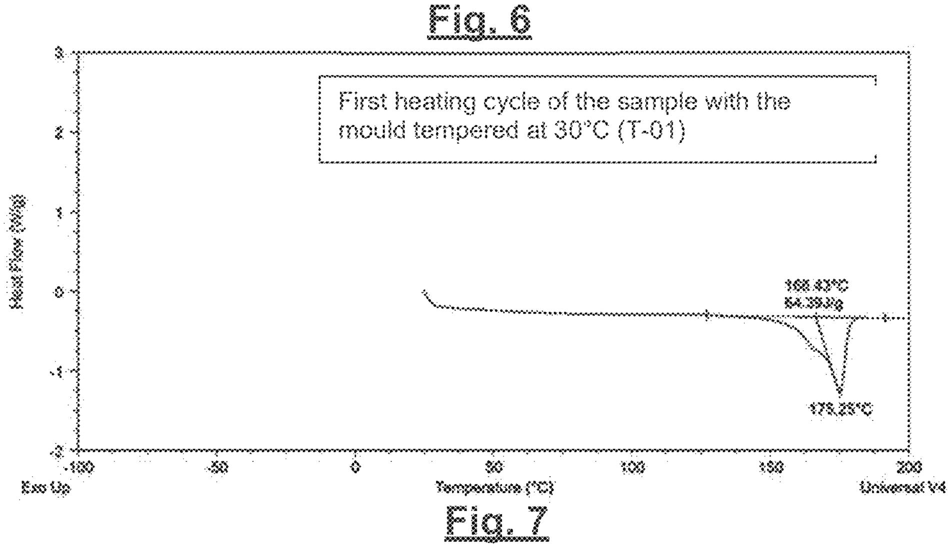
FIG. 7 is a DSC curve of the first heating cycle of a sample of the composition of the material of the invention with the mold tempered at 30° C.
Figure 8:
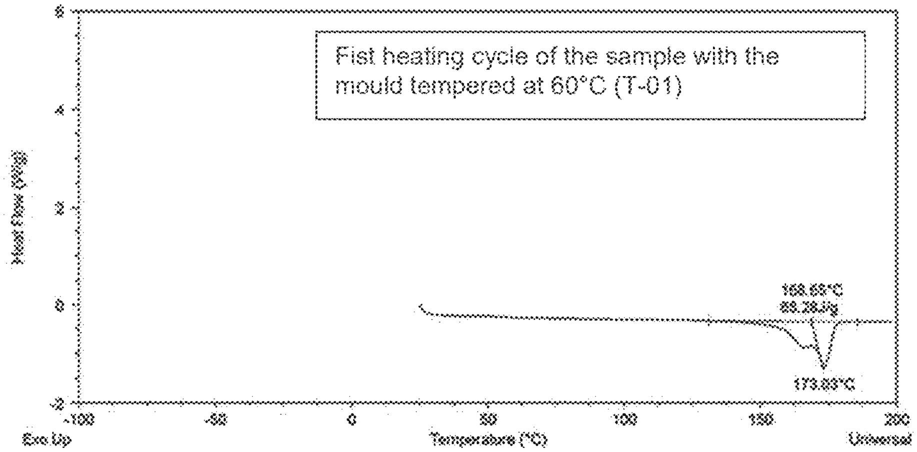
FIG. 8 is a DSC curve of the first heating cycle of a sample of the composition of the material of the invention with the mold tempered at 60° C.

The DSC curves of FIGS. 7 and 8 show the differences in the degree of crystallinity of the closures injected with the mold tempered at 30° C. and at 60° C. respectively. The DSC curves correspond to the first heating cycle of the DSC and the analyzed samples were taken from the integral hinge of the closures.

Although the degree of crystallinity of the sample varies by only 0.89 J/g, it is clear from the shape of the peak of the sample injected into the mold tempered at 30° C. that the crystalline structure formed corresponds to a metastable structure. This can be seen in the shoulder of the melting curve and the upper temperature at which the peak occurs. This metastable structure results in a lower stiffness than that obtained with a more uniform crystal structure.

This explains the higher flexibility seen in the closure injected into the mold tempered at 30° C., which allowed the integral hinge to withstand several opening and closing cycles before breaking.

Figure 9:
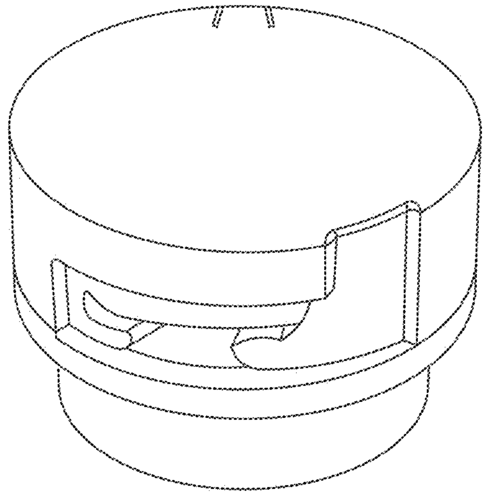
FIG. 9 shows a sample of a resulting closure of FIG. 1, but in a closed position, made of the material object of the invention, showing an incomplete filling of the cavity of the mold with the melt mixing composition of the invention and with the mold tempered at 30° C.

Regarding the filling of the cavity, with the mold tempered at 30° C., the material was not able to fill the cavity completely, as can be seen in FIG. 9. A higher setting of the injection pressure was considered to be able to solve this problem.

4.3. Injection Molding of Two Tubs

Besides the injection of flip top type closure disclosed in section 4.2, a tub (see FIG. 14) was injected starting from the same composition disclosed in section 4.1 following the same process until injecting it in a mold for tubs. Specifically, compressive strength and free fall tests were carried out.

The compressive strength test was carried out, according to an internal procedure, in a universal testing machine in which the container to be tested (the tub) is placed in the central area of a plate. A clamp is lowered until it touches the container, which is considered as the starting point. The test starts by lowering the clamp at a speed of 5 mm/min until a peak is detected in a graph of force vs deformation. Said peak is the maximum force that the tub supports under compression. The container breaks when the force which is applied exceeds this maximum force.

Starting from the T-01 composition in Table 1, the maximum strength obtained in the compressive strength test of the tub was 413 Kg and the maximum deflection was 1.27 mm.

On the other hand, another composition, referred to as T-03, with a slightly different composition, was also injected into the same tub shape. The components of T-03 were 84% in weight of PHBV in relation to the total weight of the components, 5% in weight of bioPBS FD92PM in relation to the total weight of the components (bioPBS FD92 PM is a bio-based polybutylene succinate (PBS) produced from polymerization of bio-based succinic acid and 1,4-butanediol), 8% in weight of Luzenac HAR T84 in relation to the total weight of the components and 3% in weight of Glyplast 206/5NL in relation to the total weight of the components. The maximum strength obtained was 352 Kg and the maximum deflection was 1.20 mm.

Figure 15:
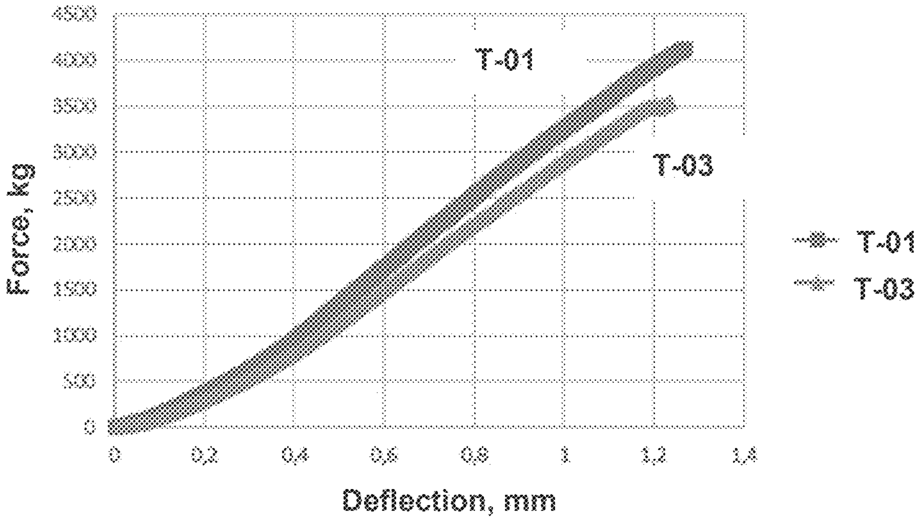
FIG. 15 is a graphic Force-Deflection of the test done with a tube like the one of FIG. 14 made from two embodiments of the material object of the invention.
Figure 17:
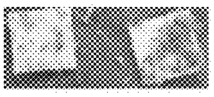
FIG. 17 depicts the samples of the material of the invention and of another different material along the weeks during a test of disintegration.
Figure 17:
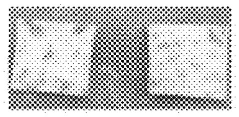
Figure 17:
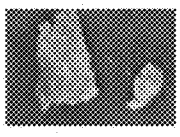
Figure 17:
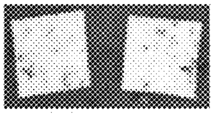
Figure 17:
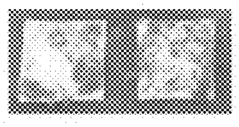
Figure 17:
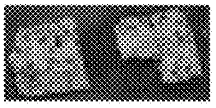

As shown in FIG. 15, the injected tube made from the composition referred to as T-01 showed a higher resistance to compression, this value being greater than 400 kg. At the end of compression, reference T-01 showed a catastrophic failure while reference T-03 showed a failure at buckling.

The free fall test was also carried out according to the internal procedure. This test is carried out in specialized equipment for drop tests, which has a height-adjustable surface (a platform) on which the container to be tested is placed. The platform is taken to a certain height from which the container is dropped. Then, a visual inspection of the container is performed, to confirm that there has not been any type of defect or deformation of it. The heights tested are the usual ones that can be found in supermarket shelves (80, 120 and 160 cm).

The tested heights in the free fall test of the tubs were 80 cm, 120 cm and 160 cm. The results tested for the tubs made of T-01 and T-03 proved that they did not break.

5. Additional Test Based on Different Compositions

Talc improves barrier properties to gases because its particles introduce themselves in the polymeric matrix preventing gas particles from passing through. However, by performing tests, talc has proved to worsen the mechanical properties of the resulting injected material; the material becoming less elastic.

Several compositions were tested to study the mechanical properties and the barrier properties. Three compositions were tested: firstly a composition made only of PHBV, secondly a composition made of PHV and a 5% of talc in weight in relation to the total weight (referred as PHBV+5TL), and thirdly a composition made of PHV and a 8% of talc in weight in relation to the total weight (referred as PHBV+8TL).

TABLE 14

| Ref. | Young Modulus Long. (GPa) | Elongation at break long. (%) | MFI (g/10 min) | OTR ($cm^3/m^2 \cdot day$) |
|---|---|---|---|---|
| PHBV | 2.80 to 3.5 | 2.00 | 42.70 ± 1.13 | |
| PHBV + 5TL | 3.35 ± 0.06 | 1.82 ± 0.11 | 34.75 ± 0.43 | 3.19 ± 0.24 |
| PHBV + 8TL | 3.56 ± 0.19 | 1.55 ± 0.15 | 40.53 ± 1.58 | 2.76 ± 0.23 |

As seen in Table 14, good results are obtained in terms of barrier properties if more talc is added, but the mechanical properties worsen: the material becomes more rigid because the Young's Modulus increases and the elongation at break decreases. The higher the amounts of talc, the better barrier properties and the lesser elasticity of the material. Since the aim is obtaining the best barrier results, the addition of talc between 7 and 9% of talc in weight in relation to the total weight of the components, preferably 8% (T-01) was maintained and the inventors tried to recover plasticity in another way.

Then, it was decided to incorporate a plasticizer to improve the plasticity of the material to try to improve the values of Young's Modulus and Elongation at Break. Different strategies were used to achieve this goal.

The first strategy was increasing the amount of plasticizer as it is shown in Table 15, wherein the cellulose CL2 used was ARBOCEL® BE600-10-TG, talc TL was LUZENAC HAR® T84, and the plasticizer PL1 was GLYPLAST 206/5 NL:

TABLE 15

| Ref. | PHBV + 15% CL2 + 8% TL + 5% PL1 | PHBV + 15% CL2 + 8% TL + 10% PL1 | PHBV + 15% CL2 + 8% TL + 15% PL1 |
|---|---|---|---|
| Young Modulus Long. (GPa) | 3.50 ± 0.10 | 3.62 ± 0.05 | 2.81 ± 0.08 |
| Elongation at break long. (%) | 1.91 ± 0.19 | 1.58 ± 0.12 | 1.77 ± 0.15 |
| MFI (g/10 min) | 28.05 ± 0.8 | 76.3 ± 3.2 | 89.7 ± 2.2 |
| OTR ($cm^3/m^2day$) | 8.66 ± 0.14 | 16.05 ± 0.64 | 32.60 ± 1.59 |
| WVTR ($g/m^2day$) | 5.76 ± 0.16 | 8.27 ± 0.52 | 13.26 ± 0.98 |

Adding 10% of plasticizer GLYPLAST 206/5 NL did not improve the Young's Modulus and the elongation at break was even worse. Moreover, the barrier properties were considerably affected. It was determined that the best option was the composition with a 5% of plasticizer.

Further compositions having xanthan gum (referred as XG in the following table) instead of the plasticizer used before were tested and other compositions having a bio-based polybutylene succinate (PBS), referred as bioPBS in Table 16, were also tested. The amount of % means % in weight in relation to the total weight of the composition.

TABLE 16

| Ref. | Young Modulus Long. (GPa) | Elongation at break long. (%) |
|---|---|---|
| PHBV + 5% bioPBS + 8% TL + 3% PL1 | 3.74 ± 0.08 | 2.03 ± 0.18 |
| PHBV + 10% bioPBS + 8% TL + 5% PL1 | 3.22 ± 0.08 | 1.67 ± 0.03 |
| PHBV + 10% bioPBS + 8% TL + 2% XG | 4.25 ± 0.09 | 1.44 ± 0.24 |

TABLE 16-continued

| Ref. | Young Modulus Long. (GPa) | Elongation at break long. (%) |
|---|---|---|
| PHBV + 8% TL + 2% XG | 4.75 ± 0.08 | 1.05 ± 0.14 |
| PHBV + 8% TL + 5% XG | 5.09 ± 0.05 | 0.95 ± 0.03 |

A slight increase in the Elongation at break is produced with a lesser amount of the second polymer, the bio-based polybutylene succinate bioPBS. In the rest of the compositions, the mechanical properties worsen and even with the starting composition, concluding that compatibility problems with the basic matrix and the new components arise.

Further tests were carried out, the results of which are shown in Tables 17 and 18. First, cellulose CL2, corresponding to ARBOCEL® BE600-10-TG, was tested. Cellulose ARBOCEL® 600/30, referred as CL1, was incorporated again to help the compostability process. Moreover, two plasticizers were tested, GLYPLAST (referred as PL1) and PROVIPLAST (referred as PL2).

TABLE 17

| Ref. | Young Modulus Long. (GPa) | Elongation at break long. (%) | MFI (g/10 min) |
|---|---|---|---|
| PHBV | 3.03 ± 0.12 | 1.91 ± 0.29 | 42.70 ± 1.13 |
| PHBV + 10% CL2 + 8% TL + 5% PL2 | 3.19 ± 0.09 | 2.07 ± 0.10 | 44.65 ± 1.53 |
| PHBV + 10% CL2 + 8% TL + 10% PL2 | 2.28 ± 0.05 | 3.22 ± 0.53 | 50.45 ± 1.45 |
| PHBV + 15% CL2 + 8% TL + 5% PL1 | 3.58 ± 0.13 | 1.61 ± 0.10 | 39.71 ± 0.38 |
| PHBV + 15% CL2 + 8% TL + 5% PL1 | 3.34 ± 0.08 | 1.71 ± 0.11 | 30.53 ± 0.78 |
| PHBV + 15% CL1 + 8% TL + 5% PL1 | 3.50 ± 0.10 | 1.91 ± 0.19 | 29.18 ± 0.55 |

TABLE 18

| Ref. | OTR ($cm^3/m^2day$) | WVTR ($g/m^2day$) |
|---|---|---|
| PHBV | | |
| PHBV + 10% CL2 + 8% TL + 5% PL2 | 24.14 ± 0.45 | 7.07 ± 0.13 |
| PHBV + 10% CL2 + 8% TL + 10% PL2 | 91.14 ± 3.24 | — |
| PHBV + 15% CL2 + 8% TL + 5% PL1 | 14.22 ± 1.47 | 5.98 ± 0.11 |
| PHBV + 15% CL2 + 8% TL + 5% PL1 | 11.05 ± 1.44 | 6.64 ± 0.09 |
| PHBV + 15% CL1 + 8% TL + 5% PL1 | 8.66 ± 0.14 | 5.76 ± 0.16 |

As seen in Tables 17 and 18, when plasticizer PL2 is incorporated, maintaining a 8% of talc (which is the one that had given the best properties in the table above), the barrier properties are very seriously affected for both amounts of 5% and 10% of plasticizer 2. Surprisingly, when including plasticizer PL1 (Glyplast), the barrier properties are not affected as much.

Regarding the two types of cellulose, it is observed how the best results are obtained with the combination of the plasticizer and the cellulose CL1 ARBOCEL® BE 600/30 PU.

It is observed that the best results are obtained with 15% of cellulose 1 (ARBOCEL® BE 600/30 PU) and 5% of plasticizer 1 (Glyplast) since it provides the best results of barrier properties, maintaining the Elongation at Break and slightly worsening the Young's Modulus. The combination that has 10% cellulose 2 and 10% plasticizer 2 (Proviplast) has the best Young's Modulus and Elongation at Break values, but it has the worst barrier properties results by far. In other words, the deterioration in the mechanical properties offered by the combination that contains cellulose 1 (ARBOCEL® BE 600/30 PU) and plasticizer 1 (Glyplast) is less than the deterioration in barriers properties of the composition that includes celluloses 2 and plasticizer 2.

6. Adhesion Test

The material obtained from the injection of the T-01 composition is heat-weldable to other cellulose-based compostable film-type materials, particularly to a laminated films made of a layer made of PBSA combined with Natureflex® 19NK, and PBSA combined with Natureflex® 19NK and paper. Tests results of an adhesion test of the two films to the materials of the spout, including testing again two types of cellulose, are shown in Tables 19 and 20, respectively:

TABLE 19

| | Film PBSA + Natureflex ® 19NK | |
|---|---|---|
| Spout | PHBV + 15% CL2 + 8% TL + 5% PL1 | PHBV + 15% CL1 + 8% TL + 5% PL1 |
| T (° C.) | 150 | 150 |
| Pressure (psi) | 47 | 47 |
| Time (s) | 2 | 2 |

TABLE 20

| | Film PBSA + Natureflex ® 19NK + Paper | |
|---|---|---|
| Spout | PHBV + 15% CL2 + 8% TL + 5% PL1 | PHBV + 15% CL1 + 8% TL + 5% PL1 |
| T (° C.) | 150 | 150 |
| Pressure (psi) | 47 | 47 |
| Time (s) | 2 | 2 |

The seals of the tested films and the spouts were fine.

7. Tests of Compostability at Laboratory Scale

Tests of compostability were carried out with several materials resulting from the injection of different compositions.

The tests that were carried out in a laboratory, starting in February 2021 and finishing in June 2021, were the following:

Evaluation of HOME compostability in compliance with HOME Compostable DIN Certco certification scheme according to Standard NF T 51-800 and OK compost HOME TUV Austria Certification Scheme according to Doc. Ref.: OK compost HOME certification scheme OK 2 Edition D, Determination of the degree of disintegration of plastic materials under defined composting conditions in a laboratory-scale test according to requirements established in NF T 51-800, OK compost HOME certification scheme OK 2 Edition D and following the technical procedure detailed in ISO 20200:2016.

The equipment used was a HOME biodegradation oven EC31/ITN, a HOME disintegration system EC31/ITN and mesh sieves EC06/ITN.

The test sample was made of the injection of the composition made from 72% of PHBV ENMAT™ Y1000P, 15% of cellulose ARBOCEL® BE 600/30 PU, 8% of talc Luzenac HAR T84 and 5% of plasticizer Glyplast 206/5NL.

Compostability tests results were: Thickness, μm (Mean+SD) zone=467.80±4.24, and Volatile solids, % (Mean+SD)=93.49±0.05. Regarding the disintegration of the tested material, the mean of the replicates was 100%.

The observations cited in the report of the compostability test mentioned that disintegration met the success criteria set out in Standard NF T 51-800 and OK compost HOME certification scheme OK 2 Edition D and following the technical procedure detailed in UNE-EN ISO 20200:2016. It was also mentioned that after 180·days, the disintegration degree of the material is 100%, i.e. greater than the 90% required by the standard. This can be observed in FIGS. 18 and 19.

Regarding the characterization of test sample, the tests were carried out with groups of three rectangular pieces for each sample, cut from a corresponding disc-shaped specimen made of the material (see FIG. 16) with a diameter of 25 mm and a thickness of 468.80±4.24 μm with a solid part of 99.09±0.01% and a volatile part of 93.49±0.05%. The test consists of introducing 4 samples, 2 of the material to be evaluated and 2 of reference in a substrate with the composition of Table 21.

TABLE 21

| Biowaste properties | | | |
|---|---|---|---|
| Composition of the artificial biowaste | | | Wet weight (kg) |
| Rabbit feed (alfalfa-based) | | | 135.00 |
| Mature compost: | | | 45.00 |
| Sawdust: | | | 180.00 |
| Cornstarch: | | | 45.00 |
| Saccharose: | | | 22.50 |
| Corn oil: | | | 18.00 |
| Urea: | | | 4.50 |
| Water | | | 550.50 |
| Physico-chemical properties of the artificial biowaste | | | |
| C/N ratio: 27.27 | pH: 5.93 | Dry solids: 42.11% | Volatile solids: 89.25% |

Each sample is placed in a box (composting reactor) together with a substrate for 180·days at 25±5° C. to assess whether the study specimens disintegrate by at least 90%. Table 22 shows the disintegration test conditions.

TABLE 22

| Description of the composting reactors | | |
|---|---|---|
| Polypropylene box with dimensions 30 × 20 × 10 cm long, wide and high, respectively, and lid that prevents excessive evaporation. On the sides of each box, two holes of 5 mm in diameter and 6.5 cm in height on the bottom of the box allow the exchange of gases with the outside. | | |
| Replicates: 2 | Test performed: | Disintegration |
| Turning and test duration: | 180 days | |
| Temperature, ° C.: | 25 ± 5 | |
| Disintegration test - Final form | | |
| Thickness < 5 mm | Size 25 × 25 mm? | Yes |
| Thickness > 5 mm | Size 15 × 15 mm? | No |
| Test requirements: Is the test material between 0.5 and 2% on wet weigh basis in its final form? | | Yes |

Figure 18:
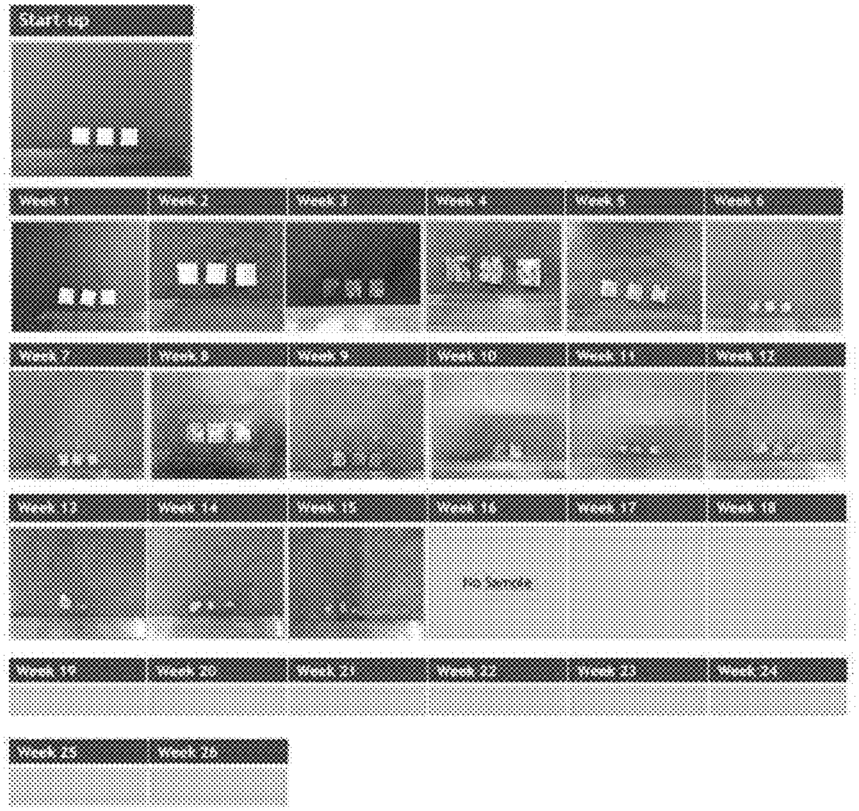
FIG. 18 are visual observations of the samples of the material of the invention in a test for determining the degree of disintegration under defined conditions in a laboratory-scale test.
Figure 19:
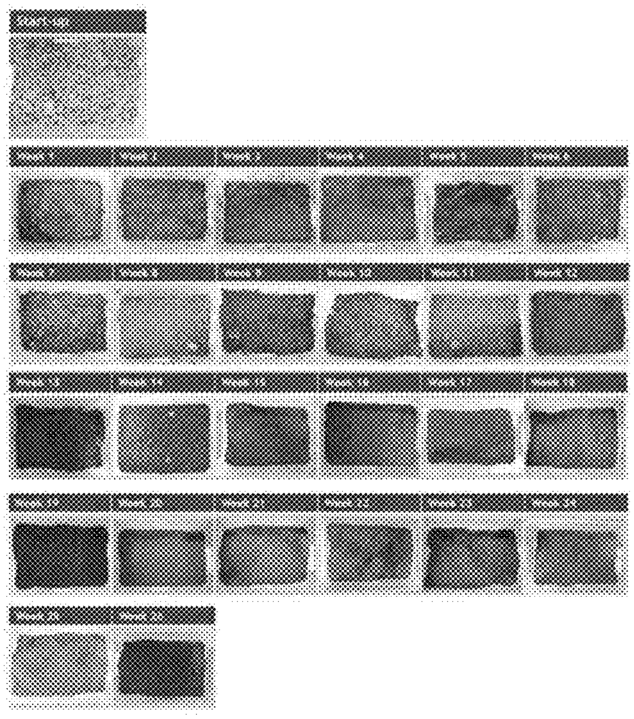
FIG. 19 is the appearance of the test material and reactor during the test referred to in FIG. 18.

To determine the percentage of disintegration at day 180, the samples are extracted from inside the reactors using 3 sieves of 10 mm, 5 mm and 2 mm. This undisintegrated sample is cleaned and dried. The dry weight is compared with the weight introduced at the beginning of the test, obtaining the degree of disintegration. For a sample to be considered disintegrable, the percentage of recovered sample must be less than 10%, that is, the percentage of disintegration must be equal to or greater than 90%. The visual aspect as weeks go by of the samples and the boxes with the artificial biowaste where the samples are introduced is seen in FIGS. 18 and 19.

An analysis of the characteristics of the substrate before and after the test is also made to verify that there has been no alteration of the same and that therefore the disintegration of the samples does not alter the substrate and still allows plants to grow.

Table 23 shows the disintegration degree of the test material, Table 24 shows the validity criteria of the disintegration test and Table 25 the physico-chemical properties of compost after disintegration test according to ISO 20200:2016.

TABLE 23

| Disintegration degree | Test sample Replicate 1 | Test sample Replicate 2 |
|---|---|---|
| Weight of total dry solids in the test material input. g | 15.00 | 15.00 |
| Weight of total dry solids in the retrieved test material > 2 mm. g | 0.00 | 0.00 |
| Di. % | 100.00 | 100.00 |

TABLE 24

| Test validity - Decreased volatile solids content compliance | | | | | |
|---|---|---|---|---|---|
| Blank replicate 1 | | | | | |
| Initial mass of wet synthetic waste, g: | 1004.00 | DSi: | 42.11 | DSf: | 38.72 |
| Final mass of wet synthetic waste, g: | 689.35 | VSi: | 89.25 | VSf: | 81.41 |
| R: | 46.55 | | | | |
| Blank replicate 2 | | | | | |
| Initial mass of wet synthetic waste, g: | 1006.95 | DSi: | 42.11 | DSf: | 35.72 |
| Final mass of wet synthetic waste, g: | 695.70 | VSi: | 89.25 | VSf: | 81.91 |
| R: | 61.62 | | | | |
| Test material replicate 1 | | | | | |
| Initial mass of wet synthetic waste, g: | 1018.05 | DSi: | 42.11 | DSf: | 33.88 |
| Final mass of wet synthetic waste, g | 698.25 | VSi: | 89.25 | VSf: | 80.09 |
| R: | 51.21 | | | | |
| Test material replicate 2 | | | | | |
| Initial mass of wet synthetic waste, g: | 1022.70 | DSi: | 42.11 | DSf: | 33.02 |
| Final mass of wet synthetic waste, g | 700.80 | VSi: | 89.25 | VSf: | 49.65 |
| R: | 52.05 | | | | |

TABLE 24-continued

| Test validity - Decreased volatile solids content compliance | |
|---|---|
| Is the decrease in volatile solids content greater than 30% for all cases? | Yes |
| Is the standard deviation below 20% of the average? | Yes |

Observations:
Disintegration meets the success criteria set out in Standard NF T 51-800 and OK compost HOME certification scheme OK 2 Edition D and following the technical procedure detailed in UNE-EN ISO 20200: 2016. After 180 days, the disintegration degree of the material is 100%, more than the 90% required by the standard.

TABLE 25

Physico-chemical properties of compost after disintegration test

| Parameter | Blank replicate a | Blank replicate b |
|---|---|---|
| $C_{total}$ | 39.52 | 38.88 |
| $N_{total}$ | 2.67 | 3.21 |
| C/N | 14.80 | 12.11 |
| pH | 5.25 | 5.25 |
| Dry solids, % | 38.72 | 35.72 |
| Volatile solids, % | 81.41 | 81.91 |
| **Parameter** | **Test material replicate a** | **Test material replicate b** |
| $C_{total}$ | 39.10 | 37.43 |
| $N_{total}$ | 2.71 | 2.77 |
| C/N | 14.43 | 13.51 |
| pH | 5.14 | 5.05 |
| Dry solids, % | 33.38 | 33.02 |
| Volatile solids, % | 80.09 | 79.65 |

General observations:
Disintegration meets the success criteria set out in Standard NF T 51-800 and OK compost HOME certification scheme OK 2 Edition D and following the technical procedure detailed in UNE-EN ISO 20200: 2016. After 180 days, the disintegration degree of the material is 100%, more than the 90% required by the standard.

When building the final product, since certified constituents have been used, the steps of characterization, biodegradation and ecotoxicity are understood to have been overcome.

Figure 16:
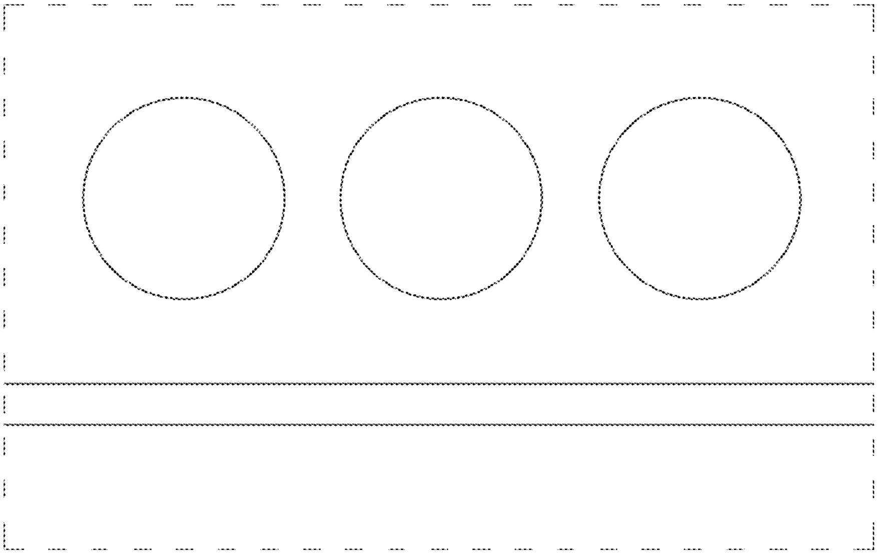
FIG. 16 is the visual aspect of disc-shaped samples of the material of the invention to be used for a test for the determination of the degree of disintegration of the material.

Finally, it should be mentioned that besides the material of the invention, another material was tested, namely the one identified in the lower part of the table of FIG. 16 as PHBV+10% TL+10% CL2. In the same figure we can compare said composition with the one of the invention, identified as PHBV+8% TL+15% CL1±5% PL1. As seen, the sample of the material of the invention had disintegrated after week 15, while the sample of the other material disintegrated notably later, after week 22.

The invention claimed is:

1. An injection molding material for producing molded articles comprising the following components:

i) poly(3-hydroxybutyrate-co-3-hydroxyvalerate) (PHBV);

ii) cellulose, present between 12 and 17% in weight in relation to the total weight of the components;

iii) talc, present between 7 and 9% in weight in relation to the total weight of the components; and iv) a polyadipate ester-based plasticizer, present between 3 and 6% in weight in relation to the total weight of the components;

wherein the injection molded material is compostable according to the European standard EN 13432 and has barrier properties according to which the Oxygen Transmission Rate (OTR) is between 5 and 10 $cm^3/m^2$·day at 23° C. and 50% relative humidity over 24 hours according to the guidelines of ASTM D3985-17 standard, and the Water Vapour Transmission Rate (WVTR) is between 2 and 7 $g/m^2$·day at a temperature of 38° C. and 90% of relative humidity according to the guidelines of ASTM F1249-13 standard.

2. The material according to claim 1, characterized in that cellulose is present between 14.5 and 15.5% in weight in relation to the total weight of the composition.

3. The material according to claim 1, characterized in that the fiber length of the cellulose is between 30 and 45 μm, the diameter of the fiber of cellulose is between 18 and 22 μm.

4. The material according to claim 1, characterized in that the raw material of the cellulose is hardwood cellulose.

5. The material according to claim 1, characterized in that talc is present between 7.50 and 8.50% in weight in relation to the total weight of the composition, being preferably present in 8%.

6. The material according to claim 1, characterized in that the poly(3-hydroxybutyrate-co-3-hydroxyvalerate) (PHBV) has a content of hydroxyvalerate comprised between 2 and 5% in weight in relation to the total PHBV weight.

7. The material according to claim 1, characterized in that it has an Oxygen Transmission Rate (OTR) between 8.52 and 8.80 $cm^3/m^2$·day at 23° C. and 50% relative humidity over 24 hours according to the guidelines of ASTM D3985-17 standard.

8. The material according to claim 1, characterized in that it has a Water Vapour Transmission Rate (WVTR) between 5.60 and 5.92 $g/m^2$·day at a temperature of 38° C. and 90% of relative humidity according to the guidelines of ASTM F1249-13 standard.

9. The material according to claim 1, characterized in that it has a Young's modulus of 3.50±0.10 Gpa.

10. The material according to claim 1, characterized in that it has an elongation at break of 1.91±0.19%.

11. The material according to claim 1, characterized in that it has a melt flow index of 29.18±0.55 g/10 min.

12. The material according to claim 1, characterized in that the components consist in:

i) poly(3-hydroxybutyrate-co-3-hydroxyvalerate) (PHBV);

ii) cellulose, present between 12 and 17% in weight in relation to the total weight of the components;

iii) talc, present between 7 and 9% in weight in relation to the total weight of the components; and iv) a polyadipate ester-based plasticizer, present between 3 and 6% in weight in relation to the total weight of the components.

13. The material according to claim 1, characterized in that a further component is a bio-based polybutylene succinate (PBS) produced from polymerization of bio-based succinic acid and 1,4-butanediol.

14. An injection-molded article made of the material according to claim 1.

15. The injection-molded article according to claim 14, characterized in that said article is home compostable.

16. The injection-molded article according to claim 15, characterized in that the injection-molded article is conformed by one or more parts having a width of wall equal to or less than 2 mm.

17. The injection-molded article according to claim 16, characterized in that the injection-molded article is conformed by one or more parts having a width of wall equal to or less than 1 mm.

18. The material according to claim 13, characterized in that the bio-based polybutylene succinate (PBS) produced from polymerization of bio-based succinic acid and 1,4-butanediol is present between 3 and 7% in weight in relation to the total weight of the components.

19. The material according to claim 1, characterized in that cellulose is present between 14.5 and 15.5% in weight in relation to the total weight of the composition, the fiber length of the cellulose is between 30 and 45 μm, the diameter of the fiber of cellulose is between 18 and 22 μm, talc is present between 7.50 and 8.50% in weight in relation to the total weight of the composition, and the poly(3-hydroxybutyrate-co-3-hydroxyvalerate) (PHBV) has a content of hydroxyvalerate comprised between 2 and 5% in weight in relation to the total PHBV weight.

20. The material according to claim 1, characterized in that cellulose is present in 15% in weight in relation to the total weight of the composition, the fiber length of the cellulose is of 40 μm, the diameter of the fiber of cellulose is of 20 μm, the raw material of the cellulose is hardwood cellulose, talc is present in 8% in weight in relation to the total weight of the composition, and the poly(3-hydroxybutyrate-co-3-hydroxyvalerate) (PHBV) has a content of hydroxyvalerate comprised between 2 and 5% in weight in relation to the total PHBV weight.

* * * * *